United States Patent [19]
Kanao

[11] Patent Number: 5,284,185
[45] Date of Patent: Feb. 8, 1994

[54] PRESSURE-RESISTANT HELICAL CORRUGATED PIPE AND METHOD OF PRODUCING SAME

[76] Inventor: Shiro Kanao, Osaka, Japan

[21] Appl. No.: 804,544

[22] Filed: Dec. 11, 1991

Related U.S. Application Data

[63] Continuation of Ser. No. 454,557, Dec. 21, 1989, abandoned.

[30] Foreign Application Priority Data

Dec. 27, 1988 [JP] Japan .................................. 333134/88

[51] Int. Cl.$^5$ .......................................... F16L 11/112
[52] U.S. Cl. .......................................... 138/122
[58] Field of Search ............... 138/122, 129, 132, 133, 138/134, 154, 172, 173, 174, 175, 176

[56] References Cited

U.S. PATENT DOCUMENTS

| | | | |
|---|---|---|---|
| 494,972 | 4/1993 | Wiegand | 138/134 |
| 1,819,175 | 8/1931 | James | 138/129 |
| 2,475,591 | 7/1949 | Chernack | 138/133 X |
| 4,196,755 | 4/1980 | Kutnyak et al. | 138/174 X |
| 4,487,232 | 12/1984 | Kanas | 138/173 X |
| 4,590,116 | 5/1986 | Joly | 138/141 X |
| 4,754,781 | 7/1988 | Jan de Putter | 138/173 X |
| 4,860,797 | 8/1989 | Richards et al. | 138/174 X |
| 4,862,924 | 9/1989 | Kanao | 138/173 X |
| 4,928,734 | 5/1990 | Richards et al. | 138/129 X |
| 5,007,462 | 4/1991 | Kanao | 138/122 X |
| 5,109,889 | 5/1992 | Kanao | 138/122 X |

FOREIGN PATENT DOCUMENTS

| | | | |
|---|---|---|---|
| 2645946 | 10/1976 | Fed. Rep. of Germany | 138/122 |
| 24125 | of 1904 | United Kingdom | 138/133 |
| 736059 | 8/1955 | United Kingdom | 138/172 |
| 907095 | 10/1962 | United Kingdom | 138/122 |

Primary Examiner—Daniel P. Stodola
Assistant Examiner—John P. Darling
Attorney, Agent, or Firm—Sughrue, Mion, Zinn, Macpeak & Seas

[57] ABSTRACT

A pressure-resistant helical corrugated pipe comprises a helical corrugated pipe wall; and two kinds of thin metal belt plates provided as a pipe wall-constituting element. The metal belt plates are disposed at least partially in overlapping relation in the direction of the thickness of the pipe wall. The overlapped portions of the metal belt plates are spaced from and held out of contact with each other by an intermediate resin layer, and the overlapped portions are integrally connected together by the intermediate resin layer. The pressure-resistant helical corrugated pipe is produced by forming the metal belt plates into a shape conforming to the corrugated shape of the pipe wall; subsequently applying a molten synthetic resin material to one or both sides of the metal belt plates along the entire length thereof to provide belt members with the molten resin material; and helically winding the belt members before hardening of the molten resin material in such a manner that the metal belt plates are partially overlapped so that the molten resin material serves as an intermediate resin layer which holds overlapped portions of the metal belt plates in spaced, non-contact relation to each other.

10 Claims, 4 Drawing Sheets

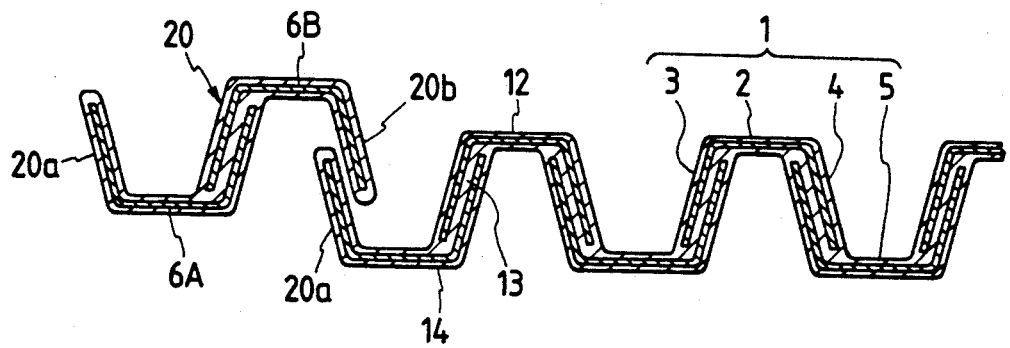
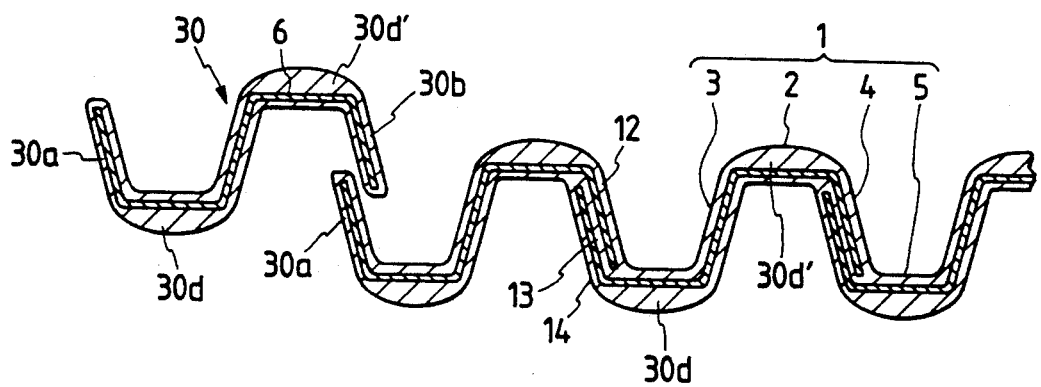
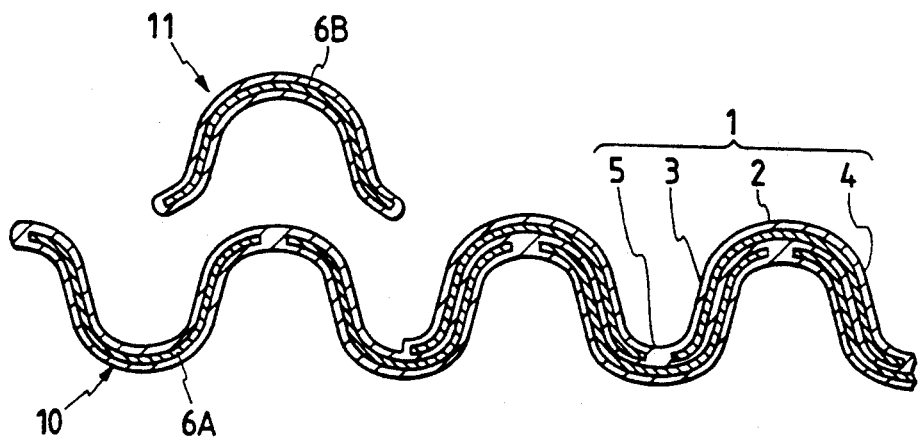

PRESSURE-RESISTANT HELICAL CORRUGATED PIPE AND METHOD OF PRODUCING SAME

This is a continuation of application Ser. No. 07/454,557 filed Dec. 21, 1989, now abandoned.

BACKGROUND OF THE INVENTION

The present invention relates to a pressure-resistant helical corrugated pipe adapted to be buried in the ground, so that telecommunication cables such as an electric cable and a telephone cable can be installed in such a corrugated pipe for the purpose of protecting such cables. Such a corrugated pipe is also used as a water main pipe, a sewer pipe, or a liquid transport pipe used in a plant or a factory. The present invention also relates to a method of producing such a pressure-resistant helical corrugated pipe.

Among such conventional pressure-resistant helical corrugated pipes, the type of corrugated pipes adapted for underground use have been required to be pressure-resistant in order to withstand a great ground pressure. In a conventional underground pressure-resistant pipe as shown in FIGS. 11 and 12 (see, for example, Japanese Laid-Open Utility Model Application No. 141889/86 filed by the applicant of the present application), a continuous reinforcing belt plate 06 made of a thin metal plate is embedded in a pipe wall 01 and extends over a top portion 02 of the helical corrugation, opposite side wall portions 03 and 04, extending from the top portion 02, and part of a bottom portion 05.

However, in such a helical corrugated pipe, the reinforcing metal belt plate 06, which is embedded in the top portion 02 of the pipe wall 01, the opposite side wall portions 03 and 04 and the bottom portion 05, is a continuous unitary plate, and therefore in order to further increase a pressure-resistant strength to withstand a flattening force, it is necessary either to increase the thickness of the whole of the metal belt plate 06 or to provide thin metal plates in overlapping relation. If the metal belt plate 06 is increased in thickness, the shaping and processing is not easy, and also it is not easy to impart a helical corrugated shape to the metal belt plate when it is helically wound, and as a result the metal belt plate is liable to deformation due to strain. This results in a problem that it is difficult to manufacture the helical corrugated pipe having a good appearance. On the other hand, if the relatively thin metal plates are used in overlapping relation, it has been found that the metal plates slidingly move relative to one another in contact with one another when an external force (particularly external force to bend the pipe) is applied to the pipe after the formation of the pipe. As a result, the edges of the thin metal plates function to cut the covering resin material so as to produce cracks in the covering resin material, thus causing the damage.

SUMMARY OF THE INVENTION

Therefore, an object of the present invention is to provide a pipe of the latter type in which a thin metal plate is disposed in the pipe wall in overlapping relation, and despite this, even when an external force tending to bend the pipe is applied to the pipe after the formation of the pipe, the pipe is not easily subjected to cracks. Another object of the present invention is to provide a method of manufacturing such a pipe having a good appearance.

According to the present invention, there is provided a pressure-resistant helical corrugated pipe having a helical corrugated pipe wall wherein two kinds of thin metal belt plates are provided as a pipe wall-constituting element; the metal belt plates are disposed at least partially in overlapping relation in the direction of the thickness of the pipe wall; the overlapped portions are spaced from and held out of contact with each other by an intermediate resin layer; and the overlapped portions are integrally connected together by the intermediate resin layer.

The present invention also provides a method of producing a pressure-resistant helical corrugated pipe having a helical corrugated pipe wall wherein two kinds of thin metal belt plates are provided as a pipe wall-constituting element; the metal belt plates are disposed at least partially in overlapping relation in the direction of the thickness of the pipe wall, the method comprising the steps of forming the metal belt plates into a shape conforming to the corrugated shape of the pipe wall 1; subsequently applying a molten synthetic resin material or the like to one or both sides of the metal belt plates along the entire length thereof to provide resin belt members with the molten resin material; and helically winding the belt members before hardening of the molter resin material in such a manner that the metal belt plates are partially overlapped so that the molten resin material serves as an intermediate resin layer which holds the overlapped portions of the metal belt plates in spaced, non-contact relation to each other, thereby forming the helical corrugated pipe wall.

When the pipe of this construction is, for example, to be buried in the ground, a groove is dug in the ground at a required depth at the installation site, and the pipe is installed along the groove. When this pipe is used as a protective pipe for a cable, an electric cable or a telephone cable is passed through the pipe using a leading wire, and then the dug soil is applied to the pipe from above to cover it. In the case of such a cable-protective pipe, it is preferred that the pipe is not provided with an inner pipe wall so that it offers a less contact resistance when the cable is installed in the pipe. In the case where the pipe is used as a water main pipe or a sewer pipe, it is preferred that the pipe be provided with the inner pipe wall so that it offers a less resistance to the flow of water.

BRIEF DESCRIPTION OF THE DRAWINGS

FIG. 1 is a partly-broken, front-elevational view of a pipe; FIG. 2 is a partly-exploded, longitudinal cross-sectional view of an important portion of the pipe;

FIGS. 3 to 10 are exploded, longitudinal cross-sectional views of main portions of modified pipes, respectively.

DETAILED DESCRIPTION OF THE PREFERRED EMBODIMENTS

Preferred embodiments of the present invention will now be described with reference to the drawings.

Figure 1:
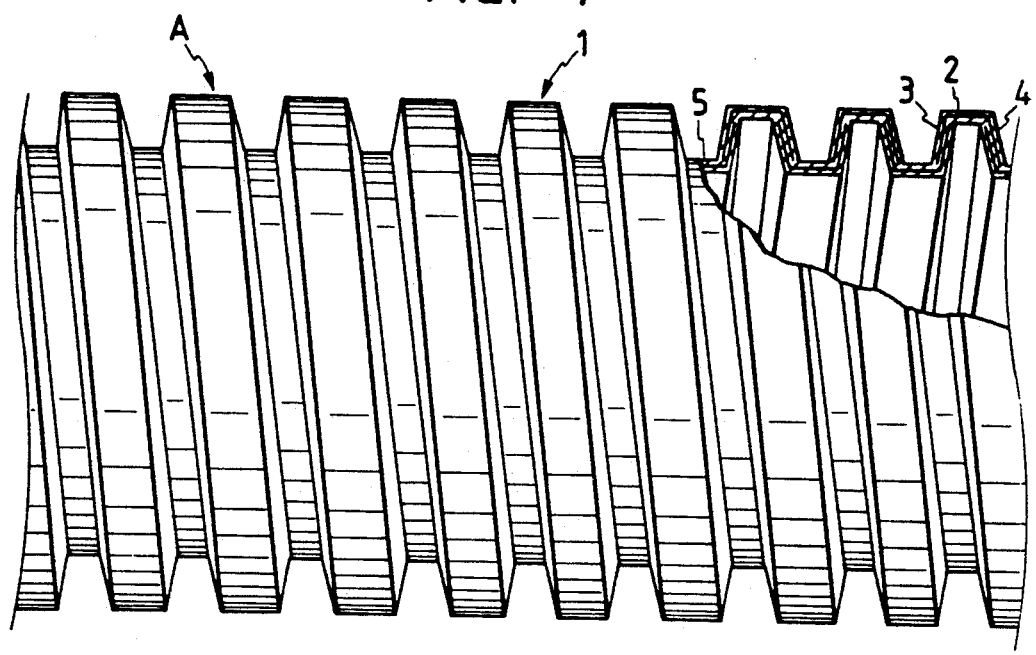
FIGS. 1 and 2 are illustrative of a first embodiment of the present invention.
Figure 11:
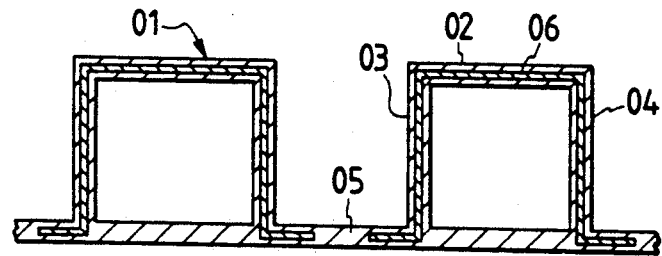
FIGS. 11 and 12 are a longitudinal cross-sectional view and an exploded view of a conventional construction.
Figure 12:
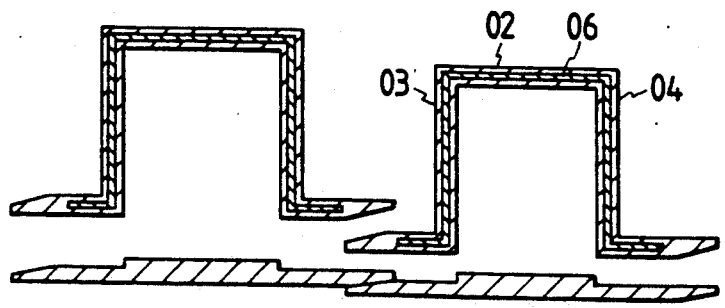
Figure 2:
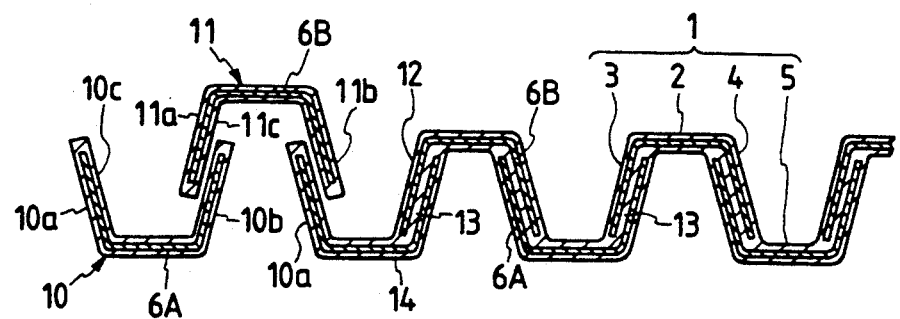

FIGS. 1 and 2 show one preferred embodiment of the invention (hereinafter referred to as "first embodiment"). A helical corrugated pipe A shown in FIG. 1 is a synthetic resin pipe, and has a pipe wall having an angular corrugated trapezoidal cross-section. Metal belt plates, constituting parts for strengthening the pipe wall 1, are covered with a synthetic resin material over the entire inner and outer peripheral surfaces thereof. In other words, the metal belt plates are embedded in the covering wall of the synthetic resin.

For forming the helical corrugated pipe A, as shown in FIG. 2, there are used a steel belt plate 6A of an angular U- shaped cross-section (hereinafter referred to as "trapezoidal U-shape") having a short side of the trapezoid and opposite inclined sides extending therefrom, and a steel belt plate 6B which is inverted in shape to the steel belt plate 6A and hence has a downwardly-open trapezoidal U-shape. First, the upwardly-open belt plate 6A is passed through a synthetic resin extruder (not shown) so that the synthetic resin material is fused onto the entire inner and outer peripheral surfaces of the belt plate 6A to provide a molded belt member 10. The belt member 10 is helically wound step by step in such a manner that the turns of the belt member 10 are spaced from one another at predetermined intervals. Then, the downwardly-open steel belt plate 6B separate from the above steel belt plate 6A is similarly passed through the extruder so that the synthetic resin material is fused onto the entire inner and outer peripheral surfaces of the belt plate 6B to provide a belt member 11. The belt member 11 is helically wound astride the precedingly-wound belt member 10, as shown in the left side of FIG. 2, and a resin molded layer 11c at the inner sides of the opposite leg portions 11a and 11b of the belt member 11 is fusingly joined integrally to a resin molded layer 10C at the outer sides of the opposite leg portions 10b and 10a disposed respectively in contiguous relation to the leg portions 11a and 11b, thereby integrally connecting the two metal belt plates 6A and 6B by the resin molded layers 10c and 11c.

In this embodiment, the metal belt plates 6A and 6B are disposed at the opposite side wall portions 3 and 4 of the pipe wall 1, and are disposed in a double manner in overlapping relation to each other in the direction of the thickness of the pipe wall 1, with an intermediate resin layer 13 interposed therebetween. The entire inner and outer peripheral surfaces are covered respectively by an inner resin layer 14 and an outer resin layer 12.

Figure 3:
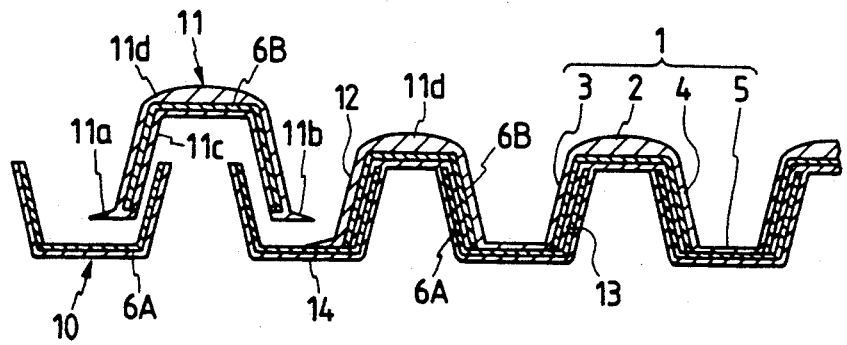

FIG. 3 shows another embodiment (hereinafter referred to as "second embodiment") of a helical corrugated pipe of a trapezoidal corrugated cross-section generally similar in shape to the helical corrugated pipe A of the first embodiment of FIG. 1. As in the first embodiment, there are used two kinds of stainless steel belt members 6A and 6B respectively having an upwardly-open trapezoidal U-shaped cross-section and a downwardly-open trapezoidal U-shaped cross-section. A covering synthetic resin layer is formed only on the lower side or surface of the upwardly-open belt plate 6A by fusion to thereby provide a belt member 10. The belt member 10 is helically wound in such a manner that the turns of the belt member 10 are spaced from one another at predetermined intervals as in the first embodiment. A resin is molded onto the entire inner and outer peripheral surfaces of the other stainless steel belt plate 6B to provide a resin molded belt member 11. The molded resin is thickened at the top portion of the belt member 11 to form an arcuate thickened portion 11d, and the lower ends of the bet member 11 are projected laterally and outwardly to form projecting portions 11a and 11b. The belt member 11 is helically wound astride the precedingly- wound belt member 10, as in the first embodiment, and the inner resin layer 11c of the belt member 11 is fusingly joined integrally to the upwardly-open belt plate 6A, and also the laterally projecting portions 11a and 11b are fused together, thereby forming the continuous helical pipe.

In this embodiment, the synthetic resin material is beforehand fused integrally to the entire inner and outer peripheral surfaces of the downwardly-open metal belt plate 6B. Thus, the metal belt plate 6B is embedded in the covering material of the synthetic resin. The upper side of the upwardly-open belt plate 6A is disposed in and covered by the inner resin layer 11c of the resin molded belt member 6B and the resin layer of the laterally projecting portions 11a and 11b. The thickened synthetic resin portion 11d is formed on the outer surface of the top portion 2 of the pipe wall 1.

Figure 4:
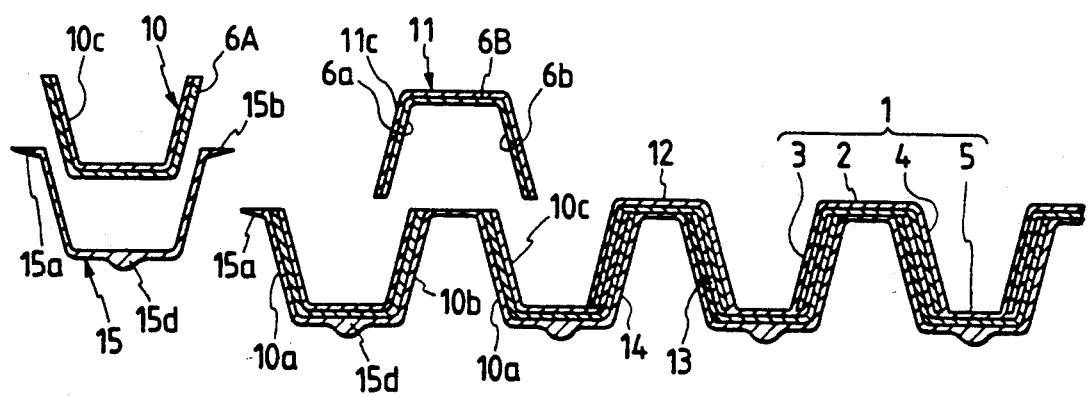

In an embodiment of the invention shown in FIG. 4, there are used two kinds of metal belt plates 6A and 6B of a trapezoidal U-shaped cross-section as in the first embodiment. Synthetic resin layers 10c and 11c are respectively formed only on their upper sides by fusion to provide belt members 10 and 11. The pipe is formed by these belt members and a belt member 15 of an upwardly-open trapezoidal shape which is separate therefrom and made solely of a synthetic resin. The belt member 15 has a projection 15d at a lower surface of its base, and also has laterally and outwardly projecting portions 15a and 15b.

In this embodiment, the synthetic resin belt member 15 is first helically wound with the projecting portions 15a and 15b fused together. Then, the upwardly-open belt member 10 is helically wound on the belt member 15 in superimposed relation, and is bonded thereto. Then, the downwardly-open belt member 11 is wound on the adjacent leg portions 10b and 10a of the belt member 10, and the inner surfaces of the leg portions 6a and 6b of the metal belt plate 6B of the belt member 11 are integrally bonded to the fusing resin layer 10c of the precedingly-wound belt member 10. In this helical corrugated pipe construction, the fusing resin layer 10c serves as the intermediate resin layer 13 of the pipe wall 1 which is interposed between the overlapped portions of the two metal belt plates 6A and 6B.

FIG. 5 shows a further embodiment in which a resin material is integrally molded onto the entire peripheral surfaces of metal belt plates 6A and 6B as in the first embodiment. The two metal belt plates 6A and 6B of a trapezoidal U-shape are covered by a molded resin material over the entire peripheral surfaces thereof in such a manner that the synthetic resin material is interposed between one leg portions of the two metal belt plates 6A and 6B disposed adjacent to each other, thereby providing a belt member 20. The belt member 20 is helically wound with the covering resin layers of its free leg portions 20a and 20b fused together, thereby forming the helical pipe.

In an embodiment of the invention shown in FIG. 6, a metal belt plate 6 has a cross-sectional shape obtained by connecting together the trapezoidal U-shaped metal belt plates 6A and 6B of the first embodiment. In other words, the metal belt plate 6 has a recumbent S-shaped cross-section. The metal belt plate 6 is covered by a molding resin over the entire peripheral surfaces to provide a belt member 30 having thickened portions 30d and 30d' formed respectively on the lower surface of its bottom portion and the upper surface of its top portion. The belt member 30 is helically wound with the covering resin layers of its opposite side legs 30a and 30b fused together to thereby form the helical corrugated pipe. In this helical pipe construction, the thickened resin layers 30d are provided at the inner side of the bottom portion 5 of the pipe wall 1, and the thickened resin layer 30d' is provided at the upper side of the top portion 2 of the pipe wall 1. The metal belt plate 6 is disposed in overlapping relation at only one of the opposite side wall portions 3 and 4, that is, at the side wall portion In an embodiment of the invention shown in FIG. 7, with respect to a metal belt plate 6, there is used two kinds of metal belt plates 6A and 6B which have a generally upwardly-open U-shaped cross-section and a generally downwardly-open inverted U-shaped cross-section, respectively. A synthetic resin material is molded onto the entire peripheral surfaces of each of the two metal belt plates 6A and 6B, thereby providing two resin molded belt members 10 and 11. These belt members 10 and 11 are helically wound and integrally joined together, as described above in the first embodiment, thereby forming the helical corrugated pipe construction. In this construction, the pipe wall 1 has the arcuately corrugated cross-section, and the metal belt plates 6A and 6B are disposed in overlapping relation to each other in the pipe wall except at the central portions of the top portion 2 and bottom portion 5.

Figure 8:
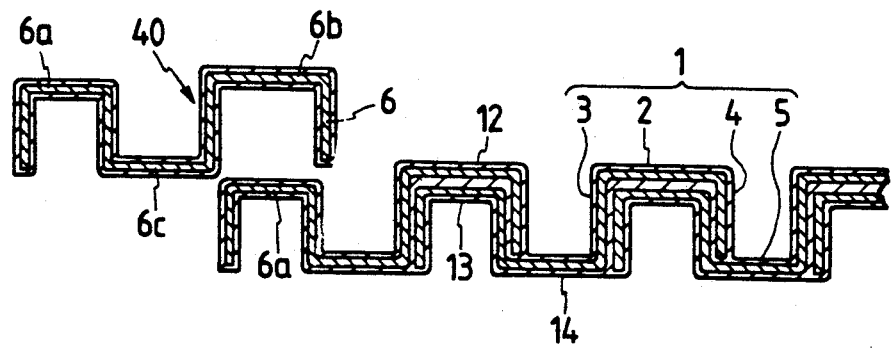

In an embodiment of the invention shown in FIG. 8, a metal belt plate 6 has a double-channel shaped cross-section having two downwardly-open channel-shaped portions 6a and 6b and a straight portion interconnecting them at their lower ends, the portion 6a being smaller than the portion 6b so as to be fitted therein. The metal belt plate 6 is covered by a synthetic resin material over the entire peripheral surfaces thereof to provide a resin molded belt member 40. The belt member 40 is helically wound in such a manner that the smaller channel-shaped portion 6a is fitted in the larger channel-shaped portion 6b, and the covering resin layers of these channel-shaped portions are fused together, thereby forming the helical corrugated pipe construction. In this construction, the pipe wall 1 has the channel-shaped corrugated cross-section, and the metal belt plate is disposed in the pipe wall in a double manner except at the bottom portion 5.

Figure 9:
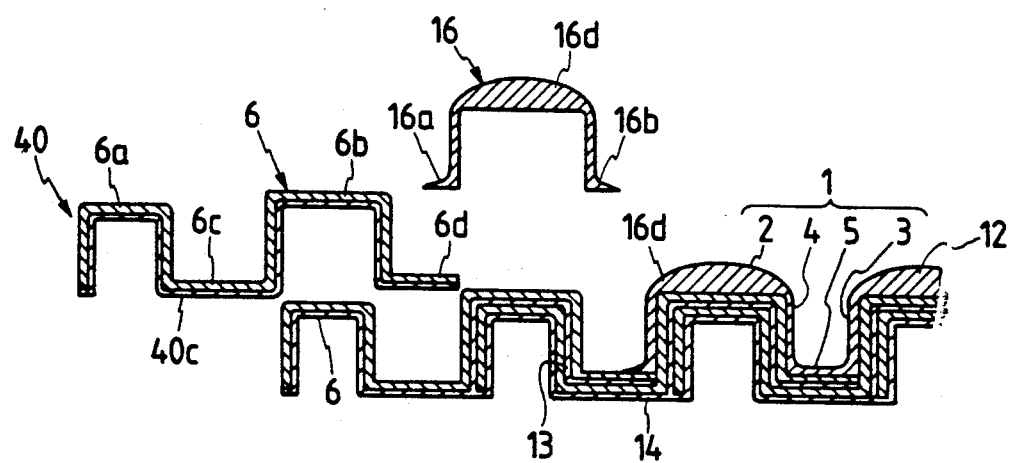

In an embodiment of the invention shown in FIG. 9, a metal belt plate 6 has a double-channel shaped cross-section similar to that shown in FIG. 8 but further having a laterally projecting portion 6d extending from the lower end of the larger channel-shaped portion 6b. A covering synthetic resin layer 40c is formed by fusion on the entire lower or inner surface of the metal belt plate 6 to provide a one-side resin molded belt member 40. This belt member 40 is helically wound with the larger channel-shaped portion 6b fitted on the smaller channel-shaped portion 6a, as in the embodiment of FIG. 8, and the laterally projecting portion 6d is superimposed on the intermediate straight portion 6c, and an integral connection is made by fusing the covering resin layer 40c. A synthetic resin belt member 16 of a downwardly-open channel-shaped cross-section, which is made solely of a synthetic resin and has a thickened top portion 16d and outwardly projecting portions 16a and 16b respectively extending laterally and outwardly from the lower ends thereof, is fitted on and fused to the larger channel-shaped portion 6b. The outwardly projecting portions 16a and 16b are fused together, and at the same time are fused to the laterally projecting portion 6d to cover the same, thereby forming the helical corrugated pipe construction. In this construction, the metal belt plate 6 is disposed in a double manner in the pipe wall 1 over the entire region of the pipe wall 1.

In the helical corrugated pipes of the above embodiments, the pipe wall 1 is not provided with an inner pipe wall provided internally of the pipe wall 1, and therefore the inner peripheral surface of the pipe has a corrugated configuration. Such a pipe is used mainly as a cable protective pipe into which a cable such as an electric cable and a telephone cable is inserted. In this case, the cable, when inserted into the pipe, comes into contact only with the corrugation of the inner peripheral surface of the pipe, and therefore the cable can be inserted into the pipe with a less frictional resistance.

Next, other embodiments having an inner pipe wall will now be described.

Figure 10:
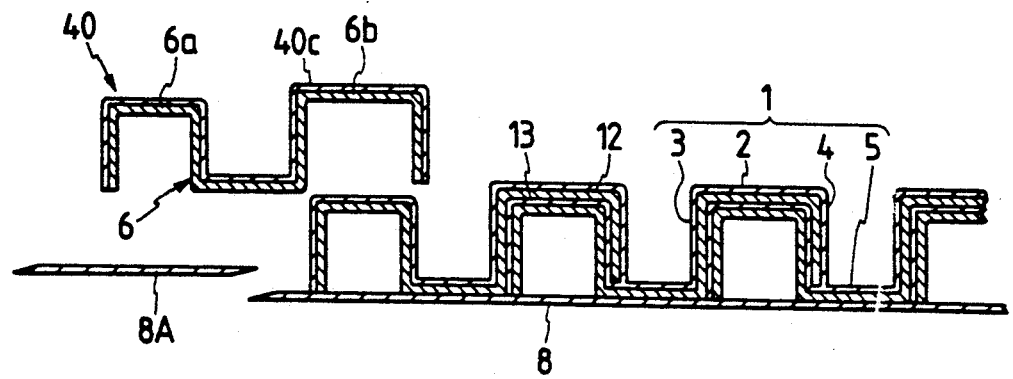

In an embodiment of the invention shown in FIG. 10, a flat belt member 8A of a synthetic resin is first helically wound, with its opposite end or edge portions overlapped each other and fused together, thereby forming a cylindrical inner pipe wall 8. A one-side resin molded belt member 40 is helically wound around the inner pipe wall 8 and is fusingly joined integrally thereto. The belt member 40 is formed by fusing and forming a synthetic resin layer 40c only on the outer peripheral surface of the a metal belt plate 6 of a double-channel shaped cross-section as in the embodiment of FIG. 8. The large and small channel-shaped portions 6b and 6a are integrally joined together through the resin layer 40c. Thus, there is provided the helical corrugated pipe construction having the inner pipe wall 8.

Such a pipe having the inner pipe wall 8 provided internally of the helical corrugated pipe wall 1 is mainly used as a water main pipe, a sewer pipe, a pipe for transporting various chemicals or the like in a plant, and a pipe for the air-borne transport of particles such as grain. In this case, because of the provision of the inner pipe wall 8, the flowing fluid in the pipe undergoes a less resistance, and therefore the fluid can be transported smoothly.

The inner pipe wall 8 can be made of other materials than soft or rigid synthetic resin material, such as a rubber material or the like. The inner pipe wall 8, if necessary, may be reinforced by a reinforcement material such as fibrous material (e.g., threads, fabric and non-woven fabric), a metal plate and a metal net. With this construction, the pipe can withstand a high internal pressure and can be used as a high-pressure transport pipe.

In the above embodiments, the pipes includes the metal belt plate 6 which is covered with the covering or coating materials of a synthetic resin or the like over the entire surfaces thereof. In other words, the pipes are of such a construction that the metal belt plate 6 is embedded in the pipe wall-forming material of a synthetic resin or the like. However, in the present invention, the two metal belt plate 6 is not always required to be covered with a synthetic resin or the like over the entire peripheral surfaces thereof. In the case where the metal belt plate 6 is made of a rust-resistant material or a material which has been subjected to a rust-prevention treatment such for example as plating, electrophoretic deposition, metallic coating and resin baking finish, the pipe can be of such a construction that the metal belt plate 6 is partially exposed at the surface of the pipe wall.

A method of manufacturing the resin molded belt members 10, 11, 20, 30 and 40 is not limited to the above-mentioned method in which the synthetic resin is extruded from the die together with the metal belt plate 6 to cover the same. For example, there can be used a covering method in which the metal belt plate 6 is dipped in a molten resin, and also other coating and resin-application methods can be used.

The cross-sectional shape of the pipe wall 1 of the helical corrugated pipes of the present invention may be other than those shown in the above embodiments, and for example, may be of a triangular corrugated cross-section or other cross-sections.

The metal belt plate 6 is not limited to a flat plate, and it can be made by a so-called perforated metal plate having a number of small perforations or punched holes formed therethrough. When synthetic resin layers are applied to such a metal plate having a number of small perforations, the synthetic resin layers on the opposite sides of the perforated metal plate flow through the perforations and are integrally joined together, so that the metal belt plate is firmly joined to the inner and outer resin layers. However, as described above in the above embodiments, the metal belt plate 6 used in the present invention is not necessarily limited to such a plate having the small perforations.

When such perforations (punched holes) are formed, the shape, size and density of such perforations can be suitably determined.

In the case where the two kinds of metal belt plates 6A and 6B are used as in the embodiments of FIGS. 1 to 5 and FIG. 7, the two metal belt plates do not need to be similar in shape to each other. For example, a combination of different shapes, such as a trapezoidal shape and an arcuate shape, can be used. Also, the two metal belt plates are not required to have the same thickness, and they can have different thicknesses, and they can be made of different materials and have different hardnesses, which can be suitably chosen. Further, the thickness of the covering resin material does not always need to be uniform over the entire region thereof. For example, as in the embodiments of FIGS. 3, 6 and 9, the thickened covering resin portion or portions may be provided at one or both of the outer side of the top portion 2 of the pipe wall 1 and the inner side of the bottom portion 5. In contrast with such embodiments, the thickened portions may not be provided over the entire widths of the top portion 2 and the bottom portion 5, but such thickened portion may be partially provided to form a projection as in the embodiment of FIG. 4.

In the case where such thickened resin portion is thus provided at the inner side of the bottom portion 5, even when wear develops due to the frictional contact of a cable or the like, the wear does not reach the metal belt plate 6, so that the metal belt plate 6 will not become bare, thus positively preventing this metal belt plate from being subjected to rust. In the case where such thickened resin portion is thus provided at the outer side of the top portion, even when the pipe is dragged at the time of installation thereof, and is brought into contact with a sharp corner of a stone or a rock so that the pipe is damaged, the metal belt plate 6, advantageously, will not be exposed immediately.

As to the material of the metal belt plate 6, instead of a thin stainless steel plate or a steel plate, an iron plate may be used.

As to the resin materials forming the pipe wall and that portion interposed between the metal belt plate overlap portions, a polyolefin such as polyethylene, polypropylene or the like, and a vinyl chloride can be mainly used, but other synthetic resins may be used. Also, rubber or a rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieves the advantageous effects of the invention mentioned below.

As described above in detail with reference to the preferred embodiments, in the helical corrugated pipe of the present invention, the wide thin metal belt plate is used, and is deformed or processed so as to serve as a pipe wall-constituting element disposed in the pipe wall. The metal belt plate is at least partially disposed in overlapping relation in the direction of the thickness of the pipe wall. The overlapped portions of the metal belt plate are spaced from and held out of contact with each other by the intermediate resin layer which is formed by the synthetic resin material or the like fused to the metal belt plate. The overlapped portions are integrally connected together through the intermediate resin layer. In this helical corrugated pipe construction, since the metal belt plate is disposed in overlapping relation in a double manner in the direction of the thickness of the pipe wall, the pipe can withstand a greater external pressure. Despite this, the overlapped portions of the metal belt plate are prevented from relative movement when the external force tending to bend the pipe is applied to the pipe. Therefore, the covering resin material will not be damaged by the side edges of the metal belt plate, thus positively preventing cracks from developing in the covering resin material. The metal belt plate can be reduced in thickness so that it can be easily processed. Even if the metal belt plate is made of a considerably thin plate, there can be provided the helical corrugated pipe which has a sufficient pressure-resistant strength to withstand a flattening force. Therefore, even when the metal belt plate is covered with the synthetic resin material over the entire inner and outer peripheral surfaces thereof, such covering synthetic resin layers can be considerably reduced in thickness. This achieves such advantages as the reduction of the overall weight of the pipe, easier transport and handling of the pipe, and the reduction of the amount of the synthetic resin to be used.

Moreover, as to the manufacture of the pipe, the metal belt plate which is rather difficult to be processed and formed into a wound shape can be made of a thin plate as described above, and therefore the pipe body can be easily manufactured. The molten resin material is applied to one or both sides of the shaped metal belt plate along the entire length thereof before the metal belt plate is helically wound, and before the molten or fusing resin material is set or hardened, the metal belt plate is helically wound with parts thereof overlapping each other. Thus, the contact between the overlapped portions of the metal belt plate is automatically avoided through the fusing resin material, and also the intermediate resin layer is automatically formed between the overlapped portions of the metal belt plates. Further, at the same time, the overlapped portions can be integrally connected together. Thus, the above excellent advantages can be achieved.

What is claimed is:

1. A pressure-resistant pipe having a helical corrugated outer surface, comprising:

a helical corrugated pipe wall including first and second thin metal belt plates which are disposed to define said corrugated outer surface of the pipe;

a resin material covering both sides of at least one of said first and second metal belt plates such that said at least one metal belt plate is embedded in said resin material, and such that said resin material forms said corrugated pipe wall, said first and second metal belt plates being disposed at least partially in overlapping relation in the direction of thickness of said pipe wall, the overlapped portions of said first and second metal belt plates being spaced from and held out f contact with each other by said resin material, and said overlapped portions being integrally connected together by said intermediate resin layer.

2. A pressure-resistant helical corrugated pipe according to claim 1, further comprising an inner pipe wall provided in said pipe wall.

3. A pressure-resistant helical corrugated pipe according to claim 2, wherein said inner pipe wall is made of a rubber material.

4. A pressure-resistant helical corrugated pipe according to claim 2, wherein said inner pipe wall is made of a material selected from a group consisting of a soft resin material, and a hard resin material.

5. A pressure-resistant helical corrugated pipe according to claim 4, wherein said inner pipe wall is reinforced by reinforcement material selected from a group consisting of a fibrous material, a metal plate and a metal net.

6. A pressure-resistant helical corrugated pipe according to claim 1, wherein said first and second metal belt plates are embedded in said helical corrugated pipe wall.

7. A pressure-resistant helical corrugated pipe according to claim 1, wherein said first and second metal belt plates are made of a material selected from a group consisting of stainless steel, steel and iron.

8. A pressure-resistant helical corrugated pipe according to claim 1, wherein said resin layer is made of a material selected from a group consisting of a polyolefin and a vinyl chloride.

9. A method of producing a pressure-resistant pipe having a helical corrugated outer surface comprising a helical corrugated pipe wall having first and second thin metal plates disposed to define said corrugated outer surface of the pipe, and disposed at least partially in overlapping relation in the direction of thickness of said pipe wall, the method comprising the steps of:

forming said metal belt plates into a shape conforming to the corrugated shape of said outer surface of the pipe;

applying a molten synthetic resin material to both sides of at least one of said metal belt plates along the entire length thereof so that the at least one belt member is embedded in the molten resin material; and helically winding said belt members before hardening of said molten resin material in such a manner that said metal belt plates are partially overlapped, and such that said molten resin material serves as an intermediate resin layer which holds overlapped portions of said metal belt plates in spaced, noncontact relation to each other, thereby forming said helical corrugated pipe wall.

10. A pressure-resistant pipe having a helical corrugated outer surface, comprising:

a helical corrugated pipe wall including first and second thin metal belt plates which are disposed to define said corrugated outer surface of the pipe;

a resin material covering both sides of each of said first and second metal belt plates such that said first and second metal belt plates are embedded in said resin material, and such that said resin material forms said corrugated outer surface of the pipe, said first and second metal belt plates being disposed at least partially in overlapping relation in the direction of thickness of said pipe wall, the overlapped portions of said resin-embedded first and second metal belt plates being spaced from and held out of contact with each other by an intermediate resin layer of the pipe wall, and said overlapped portions being integrally connected together by said intermediate resin layer.

* * * * *